United States Patent
Tominaga et al.

[19]

[11] Patent Number: 5,939,626
[45] Date of Patent: Aug. 17, 1999

[54] TIRE PRESSURE DETECTING DEVICE WHICH COMPARES DRIVEN AND DRIVING WHEEL SPEEDS AND ACCELERATION WHEREIN JUDGMENT IS PROHIBITED WHEN SLIPPAGE OCCURS

[75] Inventors: Motonari Tominaga, Anjo; Yoshihiro Nishikawa, Kakogawa; Motoji Suzuki, Kasugai; Kenji Fujiwara, Kariya; Hideki Ohashi, Toyota; Takaji Umeno, Aichi-gun, all of Japan

[73] Assignees: Nippon Soken, Inc., Nishio; Denso Corporation, Kariya; Toyota Jidosha Kabushiki Kaisha, Toyota

[21] Appl. No.: 08/935,864

[22] Filed: Sep. 23, 1997

[30]    Foreign Application Priority Data

Sep. 25, 1996  [JP]  Japan ................................. 8-275479

[51] Int. Cl.⁶ ................................................ B60C 23/02
[52] U.S. Cl. .......................................... 73/146.2; 340/444
[58] Field of Search ............................... 73/146.2, 146.5; 340/442, 444

[56]             References Cited

U.S. PATENT DOCUMENTS

| 5,561,415 | 10/1996 | Dieckmann . | |
|---|---|---|---|
| 5,721,528 | 2/1998 | Boesch et al. | 340/442 |
| 5,760,682 | 6/1998 | Liu et al. | 340/444 |
| 5,847,645 | 12/1998 | Boesch | 73/146.5 |

FOREIGN PATENT DOCUMENTS

| 650856A1 | 5/1995 | European Pat. Off. . |
|---|---|---|
| 652121A1 | 5/1995 | European Pat. Off. . |
| 729-855 | 9/1996 | European Pat. Off. . |
| 63-305011 | 12/1988 | Japan . |
| 6-286430 | 10/1994 | Japan . |
| 6-297923 | 10/1994 | Japan . |

*Primary Examiner*—William Oen
*Attorney, Agent, or Firm*—Pillsbury Madison & Sutro LLP

[57]                ABSTRACT

When pressure in any one of tires of a vehicle becomes abnormally low, the tire pressure detecting device detects it and gives a warning to a driver. The tire pressure detection is solely performed based on a value calculated by an on-board micro computer from wheel speeds of each wheel sensed by wheel speed sensors. The calculated value to be used for the tire pressure detection must represent correctly the tire pressure. Whenever the calculated value has a possibility to misrepresent the tire pressure, such value is eliminated from the data for judging the tire pressure. When the value is calculated under a situation where any tire is slipping relative to a road surface, it is highly possible that the calculated value misrepresents the tire pressure. The situation where the tire slippage exists is found out by comparing a driving wheel acceleration with a driven wheel acceleration, and the value calculated under such situation is omitted from the data to be used for judging the tire pressure. It is also possible to prohibit calculation of the value when the tire slippage is found out. Thus, the tire pressure is detected with a high reliability.

5 Claims, 6 Drawing Sheets

TIRE PRESSURE DETECTING DEVICE WHICH COMPARES DRIVEN AND DRIVING WHEEL SPEEDS AND ACCELERATION WHEREIN JUDGMENT IS PROHIBITED WHEN SLIPPAGE OCCURS

CROSS-REFERENCE TO RELATED APPLICATION

This application is based upon and claims benefit of priority of Japanese Patent Application No. Hei-8-275479 filed on Sep. 25, 1996, the content of which is incorporated herein by reference.

BACKGROUND OF THE INVENTION

1. Field of the Invention

The present invention relates to a device for detecting tire pressure of an automotive vehicle.

2. Description of Related Art

A tire pressure detecting device for an automotive vehicle is a device for watching tire pressure while the vehicle is being driven and for giving a warning to a driver if the tire pressure is decreased abnormally. There have been known two kinds of the tire pressure detecting device. One is a device which detects the tire pressure directly by measuring air pressure in tires, and the other is a device which detects the tire pressure indirectly based on rotational angular velocities of wheels sensed by wheel speed sensors.

An example of the tire pressure detecting device detecting it indirectly is disclosed in JP-A-63-305011. The device disclosed calculates a sum of rotational angular velocities for a pair of wheels located at a diagonal position and compares it with that of the other pair of wheels. If a difference between the two is smaller than a predetermined value, a tire pressure decrease in a particular wheel is judged by comparing an angular velocity of that wheel with an average angular velocity of four wheels. The detecting device of this kind can be made in a simple structure because it does not directly measure the tire pressure but detects it based on the wheel speeds. There is a drawback, however, in this device that detection accuracy of the tire pressure tends to be affected by driving conditions and conditions of a road surface. To reduce the influence from driving conditions and road surface conditions, a tire pressure detecting device disclosed in JP-A-6-286430 prohibits judging the tire pressure under certain conditions. This device calculates a vehicle body speed from an average wheel speed of driven wheels and determines whether the vehicle is under acceleration or deceleration based on a change of the vehicle body speed. If it is determined that the vehicle is accelerating or decelerating, the tire pressure judgment based on the wheel speed is prohibited because it is presumed that there is some skid between the tires and the road surface. Also, a tire pressure detecting device is known in which the tire pressure judgment is prohibited in case a wheel speed difference between driving wheels and driven wheels becomes larger than a threshold value.

However, there is a drawback in the device prohibiting the tire pressure judgment based on the calculated vehicle body speed. That is, there is a situation where the tire pressure judgment has to be prohibited even when the vehicle body speed is constant, if there is a skid between the tires and the road surface. This situation occurs, for example, when the vehicle is driven uphill. A slope sensor is equipped in this device to find out such a situation, which makes the device more complex and expensive. There is also a drawback in the later device prohibiting the tire pressure judgment based on the wheel speed difference between the driving and driven wheels. That is, the tire pressure may not be detected accurately when there is a slight difference in diameters of driving and driven wheels caused by tire abrasion. To cope with this problem, it is known to provide a computer program for learning the tire abrasion during driving. However, this is not practical because performing the learning program requires too much time.

SUMMARY OF THE INVENTION

The present invention has been made in view of the above-mentioned problems, and an object of the present invention is to provide a tire pressure detecting device which is accurate and reliable without using additional sensors such as a slope sensor or a complex learning program, and more particularly to provide such a device which is less affected by sloped road surfaces and abrasion of tires.

The tire pressure detecting device according to the present invention detects the tire pressure solely based on a value representing the tire pressure condition which is calculated by an on-board micro computer from wheel speed of each wheel sensed by wheel speed sensors. The value representing the tire pressure condition is compared with a predetermined value. If that value exceeds the predetermined value, it is judged that the tire pressure in any one of the wheels is abnormally low. As the value representing the tire pressure a relative wheel speed variation calculated according to a predetermined formula may be used.

Because the tire pressure is solely judged based on the value calculated from the wheel speeds sensed, the value has to be reliable to avoid any misjudgment. Generally, the calculated value representing the tire pressure condition does not represent correctly the tire pressure when there is some slippage between a tire and a road surface. According to the present invention, such slippage is found out by comparing driving wheel acceleration with driven wheel acceleration. When the acceleration of the driving wheel is higher than that of the driven wheel by a predetermined value, it is judged that there is tire slippage. If there is tire slippage, it is highly possible that the calculated value for judging the tire pressure condition does not represent correctly the tire pressure condition. Such possibly incorrect values are eliminated from data to be used for judging the tire pressure.

The elimination of such values is performed, according to the present invention, by prohibiting the calculation of the value representing the tire pressure condition when it is judged that there is the tire slippage. Also, the elimination may be performed by prohibiting such values from being input to a stage judging the tire pressure.

Other objects and features of the present invention will become more readily apparent from a better understanding of the preferred embodiments described below with reference to the following drawings.

DETAILED DESCRIPTION OF THE PREFERRED EMBODIMENTS

Figure 1:
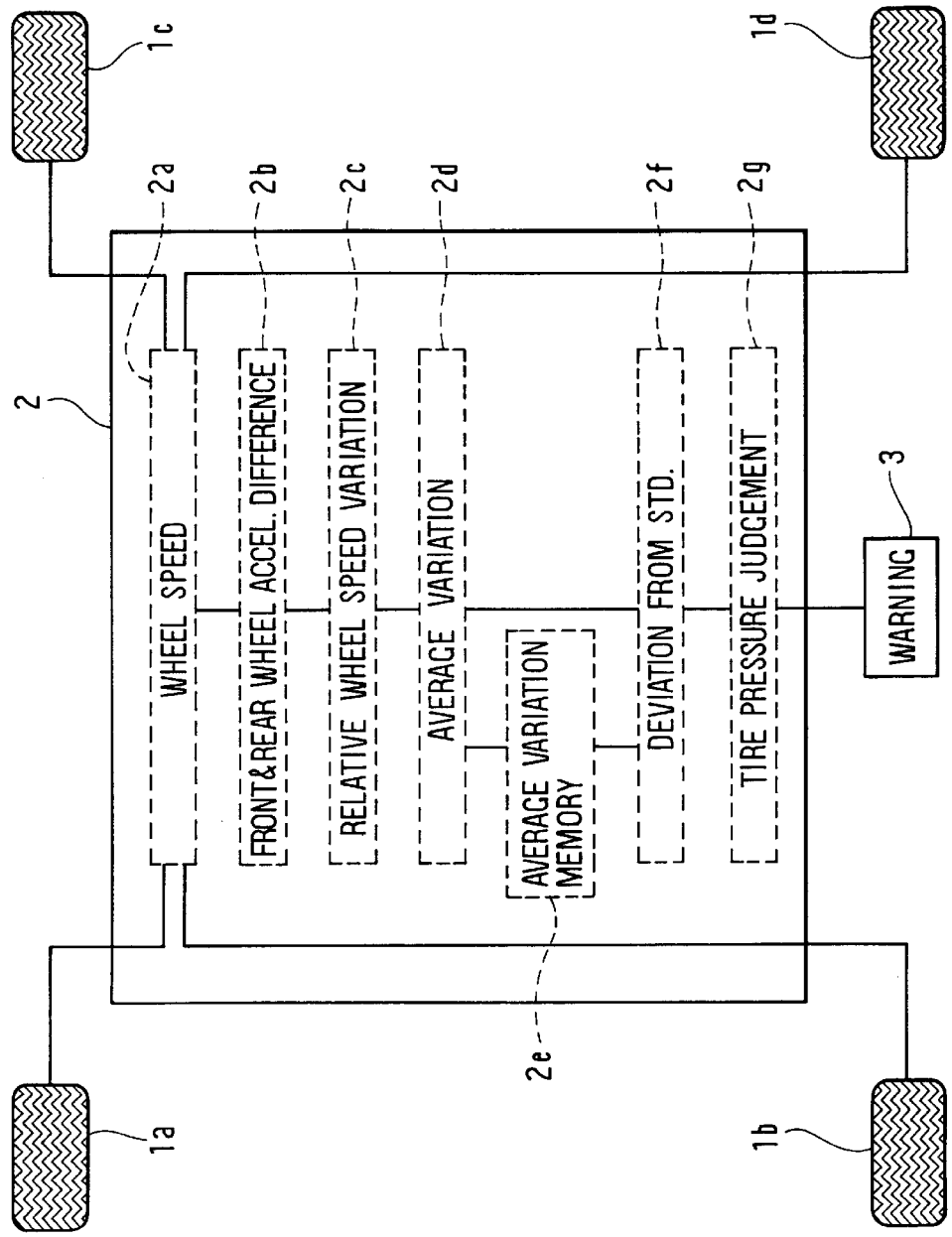
FIG. 1 His a conceptual drawing showing a tire pressure detecting device according to the present invention.

Referring to FIG. 1, a structure of an embodiment according to the present invention will be described. The tire pressure detecting device is mounted in a vehicle which is driven by front or rear wheels. The device is composed of wheel speed sensors 1a, 1b, 1c and 1d installed to respective wheels, a processing unit 2 including a micro computer to which signals from the wheel speed sensors are fed, and a warning device 3 which gives a warning to a driver when a tire pressure abnormally decreases. Two wheel speed sensors, for example, 1a and 1b are installed to the driving wheels, and the other two 1c and 1d are installed to the driven wheels.

The processing unit 2 includes a micro computer and makes a judgment whether the tire pressure is normal or not by processing pulse signals from the wheel speed sensors 1a–1d. The processing unit 2 is composed of a wheel speed processor 2a to which pulse signals representing respective wheel speeds are fed; a processor 2b for calculating wheel speed acceleration differences between front and rear wheels $\Delta A_R$ and $\Delta A_L$; a processor 2c for calculating a relative wheel speed variation D; a processor 2d for calculating an average $D_{AV}$ of the relative wheel speed variations; a processor 2f for calculating a deviation $\Delta D$ of $D_{AV}$ from a standard variation Dstd; a processor 2g for judging a tire pressure decrease; and a memory 2e for memorizing the average $D_{AV}$ of the relative wheel speed variations. Outputs from the processor 2g are fed to the warning device 3.

Figure 2:
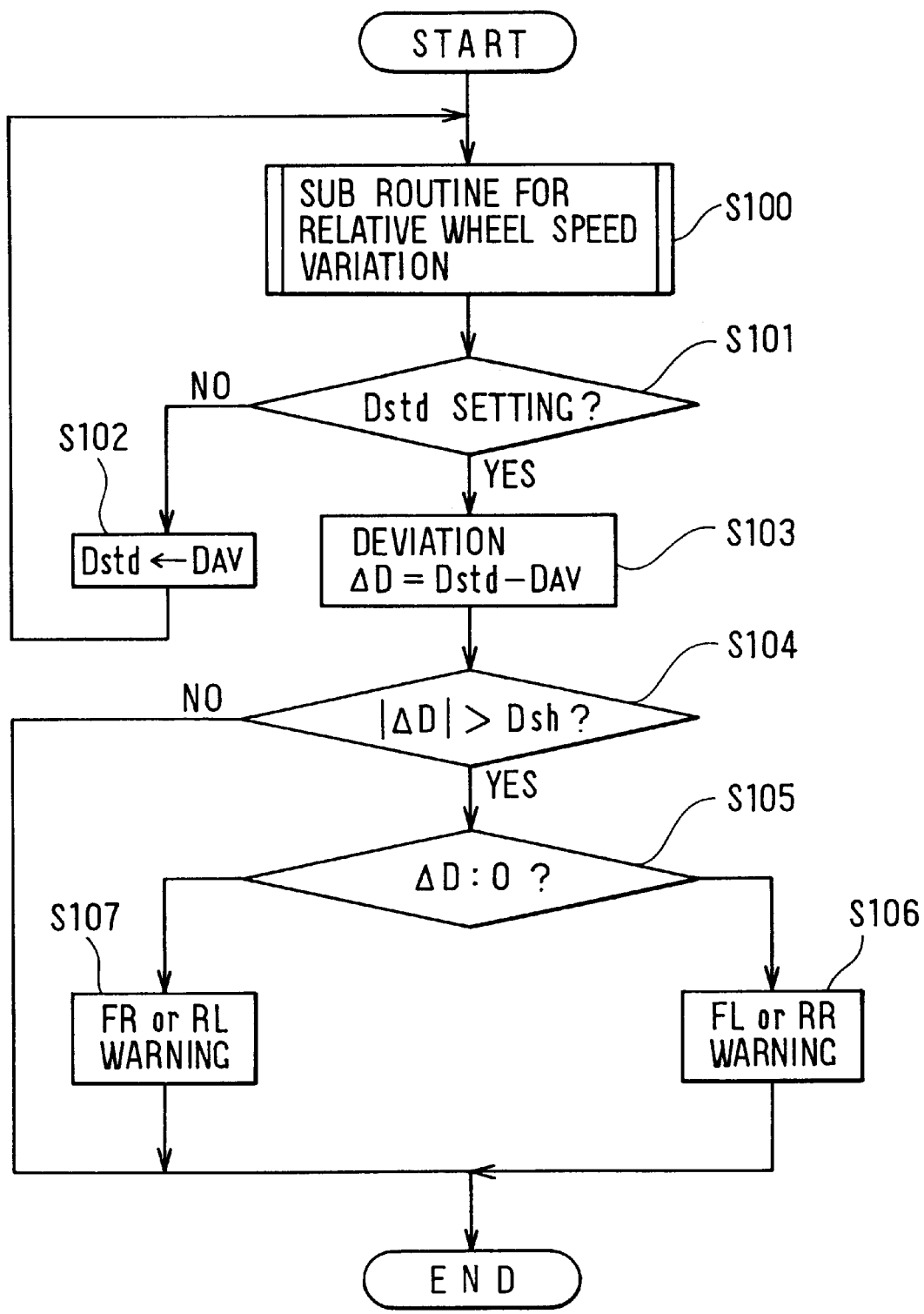
FIG. 2 is a flow chart showing an operation of the tire pressure detecting device shown in FIG. 1.

Referring to FIG. 2, an operation flow of the processing unit 2 will be described. S100 is a sub-routine for calculating the average $D_{AV}$ of the relative wheel speed variations, details of which will be described later. At a step S101, whether Dstd which is a standard value of $D_{AV}$ is already memorized or not is checked. If the standard value Dstd is not memorized, a present value of $D_{AV}$ is memorized as a standard value Dstd in the memory 2e at a step S102 and the routine returns to S100. If the standard value Dstd is memorized, the routine moves to a step S103. The step S103 corresponds to an operation of the processor 2f where $\Delta D$, which is a deviation of $D_{AV}$ from the standard variation Dstd, is calculated according to a following formula (1):

$$\Delta D = Dstd - D_{AV} \tag{1}$$

$\Delta D$ represents a tire pressure change after the Dstd is set.

Steps S104 and S105 correspond to an operation of the processor 2g. At the step S104, an absolute value of the deviation $\Delta D$ is compared with a threshold value Dsh. The threshold value Dsh is a predetermined value according to experiments and is preset in the memory of the processing unit 2. If the absolute value $|\Delta D|$ is larger than the threshold value Dsh, it is judged that the tire pressure is decreased to a level lower than a normal value. If the value $|\Delta D|$ is larger than Dsh, the routine moves to a step S105 where whether $\Delta D$ is a positive or negative value is judged. If $\Delta D$ is negative, the routine moves to a step S106 where a warning signal is given to the warning device 3 indicating that the tire pressure in a front-left (FL) wheel or a rear-right (RR) wheel has become low. If $\Delta D$ is positive, the routine moves to a step S107 where a warning signal is given to the warning device 3 indicating that the tire pressure in a front-right (FR) wheel or a rear-left (RL) wheel has become low. When it is judged that the value $|\Delta D|$ is smaller than the threshold value Dsh at the step S104, the tire pressures in all wheels are judged as normal.

Figure 3:
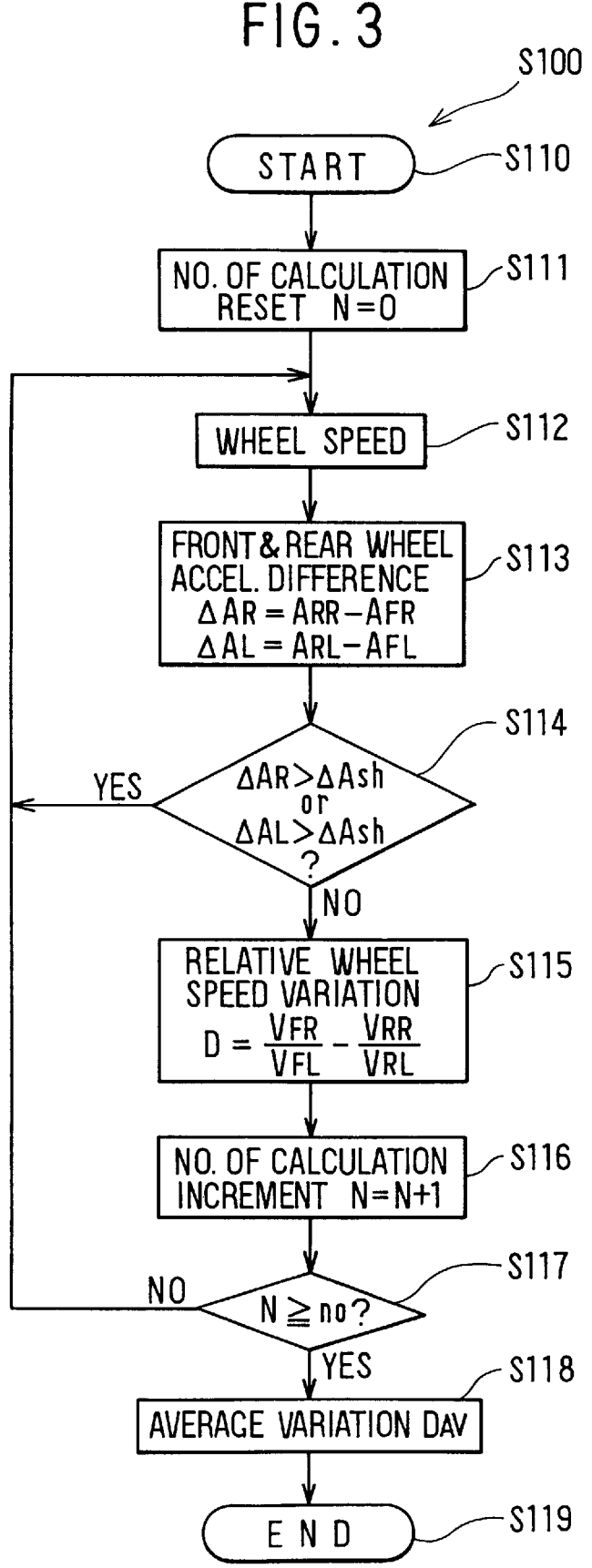
FIG. 3 is a flow chart showing a sub-routine S100 shown in FIG. 2.

FIG. 3 shows details of the step S100 where $D_{AV}$, which is an average value of relative wheel speed variations D, is calculated. The number of calculation is reset at a step S111. At a step S112 (corresponding to the operation of the processor 2a), a wheel speed for each wheel is calculated according to pulse signals sent from the wheel speed sensors 1a~1d. The wheel speed is calculated at an interval of, e.g., 0.5 seconds by counting the number of pulses sent from the wheel speed sensors in a period of, e.g., 5 milliseconds. The operation of the processor 2b is performed at steps S113 and S114. At the step S113, wheel speed accelerations of each wheel (front-right wheel acceleration $A_{FR}$, front-left wheel acceleration $A_{FL}$, rear-right wheel acceleration $A_{RR}$ and rear-left wheel acceleration $A_{RL}$) are calculated according to the wheel speed data from the step S112, that is, the wheel speed acceleration is calculated from a difference between a present wheel speed and a previous wheel speed. Then, wheel speed acceleration differences between front and rear wheels ($\Delta A_R$ for right wheels and $\Delta A_L$ for left wheels) are calculated according to the following formulae (1) and (2):

$$\Delta A_R = A_{RR} - A_{FR} \tag{2}$$

$$\Delta A_L = A_{RL} - A_{FL} \tag{3}$$

At a step S114, the acceleration differences $\Delta A_R$ and $\Delta A_L$ are compared with a threshold value $\Delta A_{sh}$, respectively. The threshold value $\Delta Ash$, which has been determined according to various tests including actual driving and simulation, is preset in the processor. If both of the acceleration differences $\Delta A_R$ and $\Delta A_L$ are smaller than the threshold value $\Delta A_{sh}$, it is judged that tires are not skidding and the routine moves to a step S115 (corresponding to the processor 2c) where the relative wheel speed variation D is calculated according to the following formula (4):

$$D = V_{FR}/V_{FL} - V_{RR}/VB_{RL} \tag{4}$$

where $V_{FR}$ is a wheel speed of the front-right wheel, $V_{FL}$ is a wheel speed of the front-left wheel, $V_{RR}$ is a wheel speed of the rear-right wheel and $V_{RL}$ is a wheel speed of the rear-left wheel. As seen from the formula (4), the relative wheel speed variation D is a difference between a front wheel speed ratio $V_{FR}/V_{FL}$ and a rear wheel speed ratio $V_{RR}/V_{RL}$, and its value varies according to each wheel speed which also varies according to the tire pressure. Therefore, the tire pressure change in any one of the tires is reflected to the value of relative wheel speed variation D.

When it is detected at the step S114 that any one of the wheel speed acceleration differences $\Delta A_R$ and $\Delta A_L$ is larger than the threshold value $\Delta A_{sh}$, it is judged that there exists slippage between tires and a road surface, and accordingly calculation of the relative wheel speed variation D is prohibited and the routine is returned to the step S112. This is because it is highly possible under this situation that the relative wheel speed variation D, even if it is calculated, does not correctly represent the tire pressure due to the tire slippage.

At a step S116, the number of calculation N is incremented by 1, and the incremented N is compared with a predetermined number $n_o$ which is for example, 4at a step S117. If the number N is equal to or larger than no (if the relative wheel speed variation D has been calculated at least no times), the routine moves to the next step S118. If the number N is smaller than $n_o$, the routine is returns to the step S112. The relative wheel speed variations D calculated at least $n_o$ times are averaged at a step S118 (corresponding to the operation of the processor 2d) to obtain an average relative wheel speed variation $D_{AV}$. The calculated average variation $D_{AV}$ is fed to the main routine shown in FIG. 2.

As described above, the calculation of the relative wheel speed variation D, according to which the tire pressure change is judged, is prohibited when one of the wheel speed acceleration differences $\Delta A_R$ and $\Delta A_L$ between front and rear wheels (between driving and driven wheels) exceeds a predetermined threshold value $\Delta A_{sh}$. In other words, when the tire slippage exists for any reasons (such as acceleration of a vehicle or driving uphill), judgment of the tire pressure is prohibited. Therefore, reliability of the tire pressure judgment is greatly enhanced though it is done solely based on the data obtained from the wheel speed sensors without using any additional sensors such as a slope sensor. Further, because the slippage or skidding of the tires is judged based on acceleration of wheels, the judgment is less affected by a tire diameter change due to its abrasion, compared with a case where such judgment is done based on a wheel speed or an angular velocity. If the tire slippage is judged based on the wheel speed, the judgment may be done in error because the FtF wheel speed changes when the tire diameter is decreased due to its abrasion even if there is no tire slippage. As opposed to the above, when the tire slippage is judged based on the wheel speed acceleration as in the present invention, the tire diameter change does not adversely affect accuracy of the judgment.

Figure 4A:
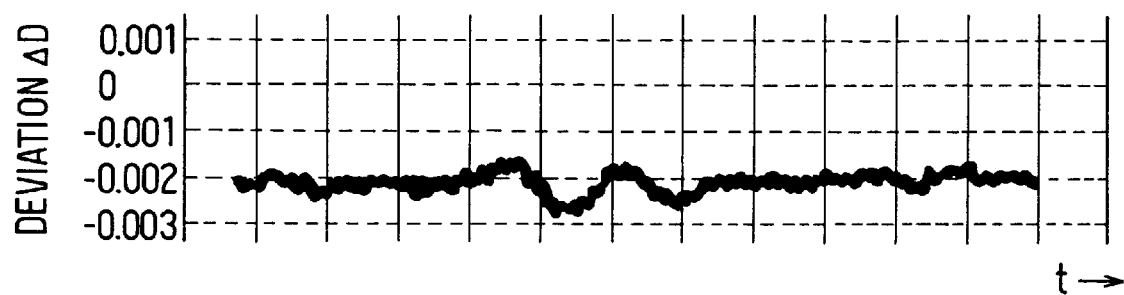
FIG. 4A is a graph showing a wheel speed deviation ΔD from an average wheel speed variation Dstd versus time, assuming that there is no means for prohibiting tire pressure judgment in the device.
Figure 4B:
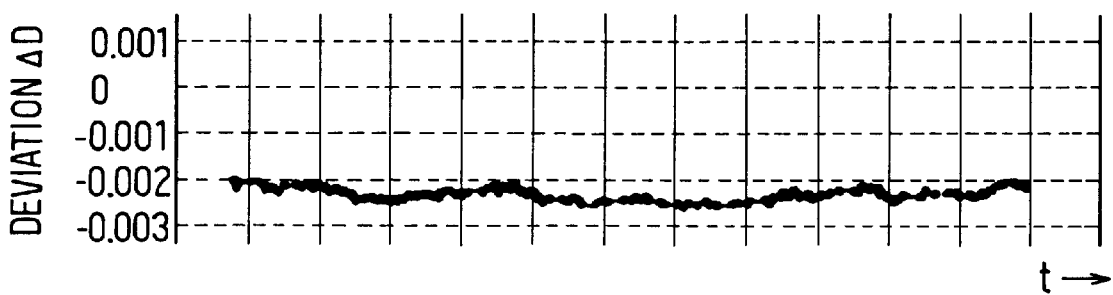
FIG. 4B is a graph showing the same as in FIG. 4A in the device which has means for prohibiting tire pressure judgment.

FIG. 4 shows variance of the deviation $\Delta D$ versus time, which is the value to determine whether the tire pressure is normal or not, calculated in a device having no means for prohibiting the calculation of the relative wheel speed variation D, under a normal tire pressure condition. In other words, the values of $\Delta D$ plotted in the graph are calculated under any situations including a situation where the tire slippage exists. As seen in the graph, the deviation $\Delta D$ varies in a wide range, and accordingly the tire pressure may be erroneously judged as abnormal even when the tire pressure is actually normal. This is because the judgment is done by comparing the value of deviation $\Delta D$ with the threshold value Dsh as mentioned above. If a larger threshold value Dsh is used to avoid such a misjudgment, the detection sensitivity will be decreased. FIG. 4B shows variance of the deviation $\Delta D$ which is calculated in the device according to the present invention having means for prohibiting the calculation of the relative wheel speed variation D under the situation where the tire slippage is detected. As clearly seen in the graph, variance of the deviation $\Delta D$ in this case is much smaller than that in the case shown in FIG. 4A. This means that the tire pressure detecting device according to the present invention can accurately detect whether the tire pressure is abnormal.

Figure 5:
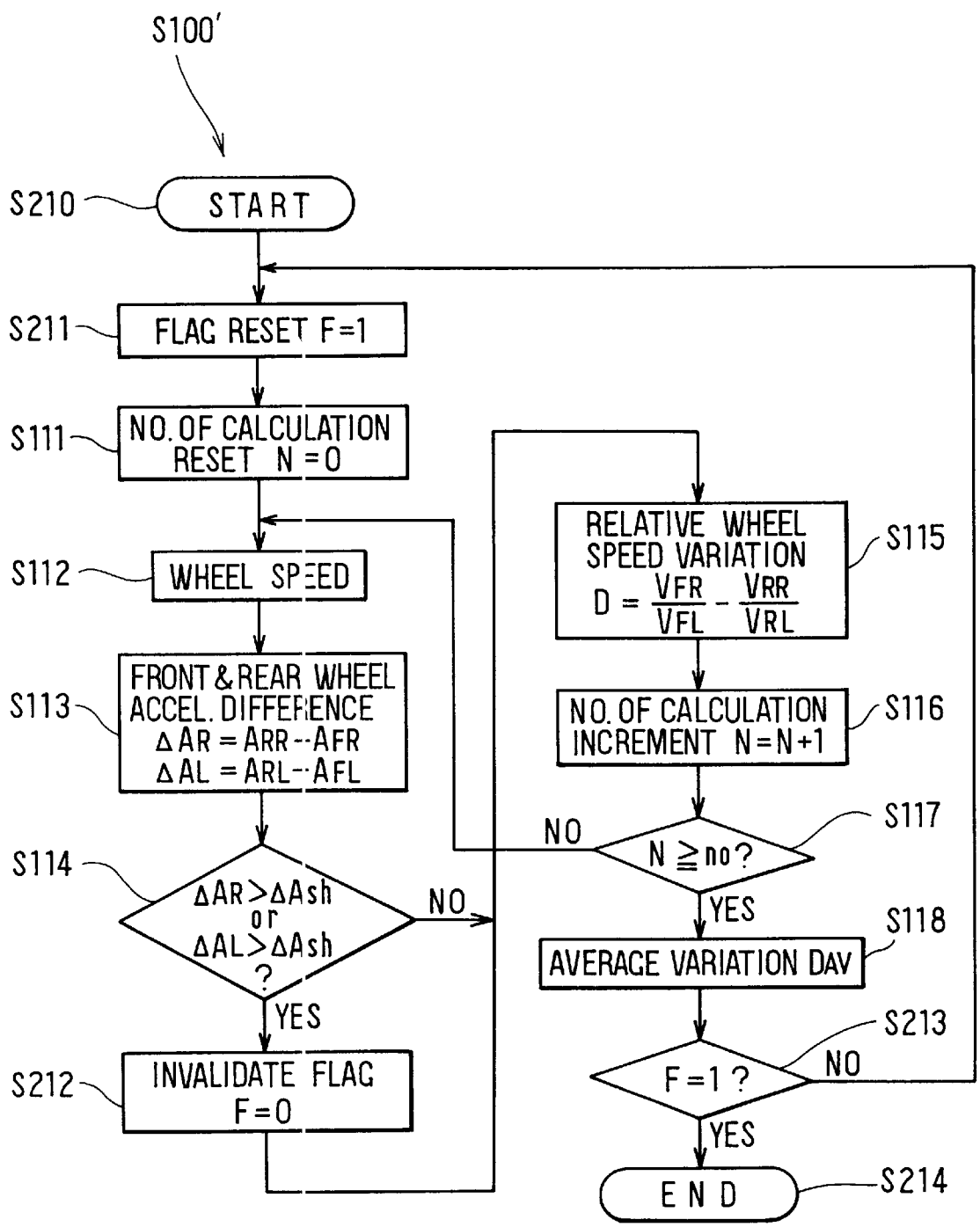
FIG. 5 is a flow chart showing a first modified form S100' of the sub-routine S100.

Referring to FIG. 5, a modified form of the sub-routine S100 shown in FIG. 3 will be described. FIG. 5 shows a first modification S100' in which steps performing the same operation as the steps shown in FIG. 3 are numbered with the same number and steps which are additional or perform a different function are numbered differently. Since the sub-routine S100' is similar to the sub-routine S100, details of the operation will not be repeated but only the difference will be explained.

At a step S211, a flag indicating to feed to the main routine the average value $D_{AV}$ of the relative wheel speed variations D calculated in this sub-routine S100' is set to 1 (a flag 1 means permitting the output to be fed, and a flag 0 prohibiting the output to be fed). The flag 1 is invalidated, i.e., it is changed to the flag 0 at a step S212 if it is judged that either one of the wheel speed acceleration differences between front and rear wheels $\Delta A_R$ and $\Delta A_L$ is larger than the threshold value $\Delta A_{sh}$ at the preceding step S114, because it is judged in this situation that there exists tire slippage of the driving wheels. When the flag is set to 0, the average $D_{AV}$ calculated in this sub-routine is invalidated. When it is judged that both $\Delta A_R$ and $\Delta A_L$ are smaller than the threshold value $\Delta A_{sh}$ at the step S114, the relative wheel speed variation D is calculated at the step S115, because it is judged in this situation that there exits no tire slippage of the driving wheels. At a step S213, the flag is checked as to whether it is 1 or 0. If the flag is 1, the average variation $D_{AV}$ calculated in the preceding step S118 is fed to the main routine. If the flag is 0, the routine returns to the step S211. This means that if there are included one or more data which are highly possible not to correctly represent the tire pressure among at least no data of the variation D which are used to calculate the average variation $D_{AV}$, then that average variation $D_{AV}$ is invalidated. In this manner, only the average variation $D_{AV}$ which is assumed to represent correctly the tire pressure is used for judging the tire pressure in the main routine.

Figure 6:
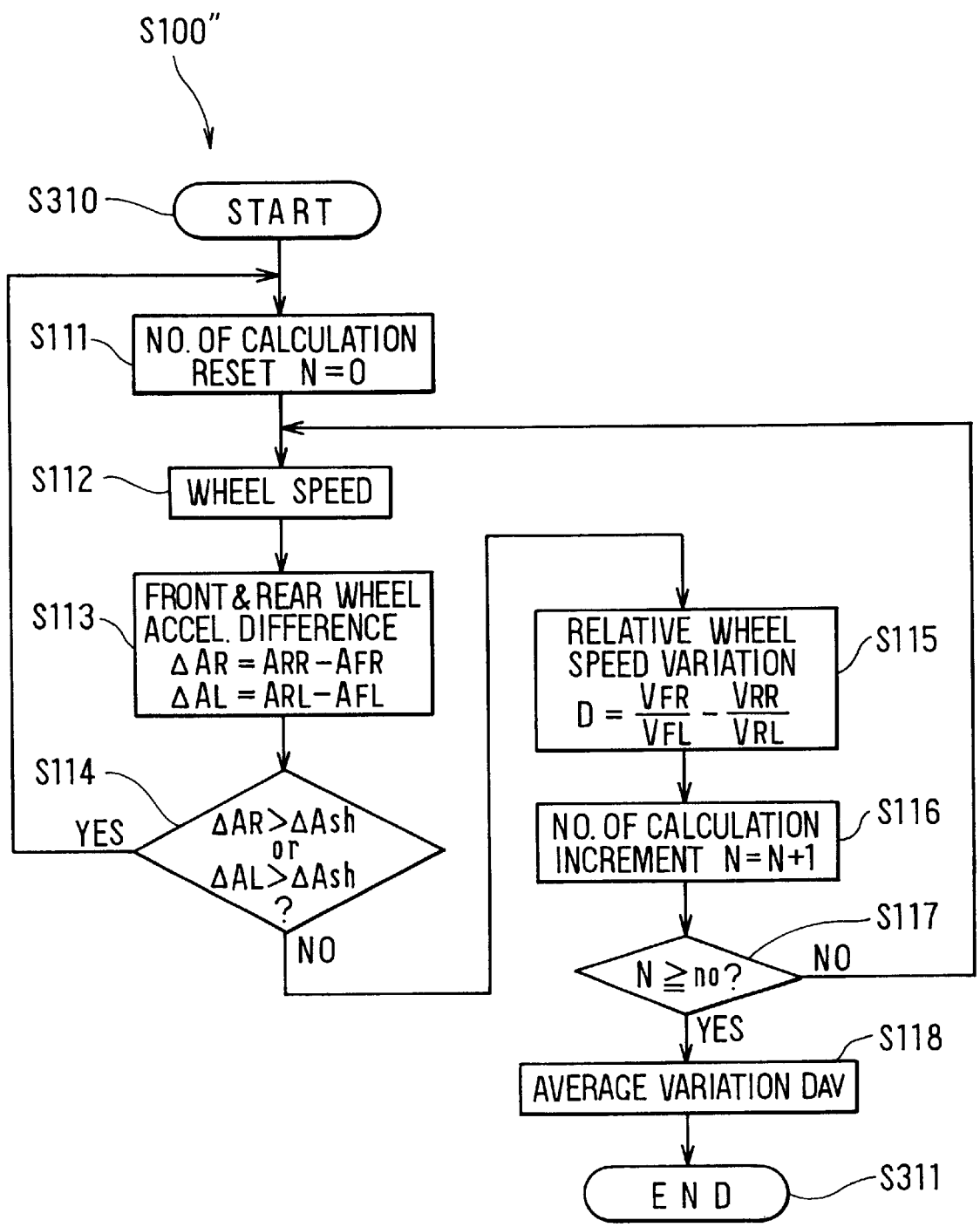
FIG. 6 is a flow chart showing a second modified form S100" of the sub-routine S100.

FIG. 6 shows a second modification of the sub-routine for calculating the relative wheel speed variation, in which the second modification is shown as a sub-routine S100". Steps in the sub-routine S100" operating in the same manner as the steps in the sub-routine S100 are numbered with the same numbers as those in the sub-routine S100. Since the sub-routine S100" is similar to the sub-routine S100 shown in FIG. 3, only certain operations different from those of the sub-routine S100 will be explained here. Referring to FIG. 6, when it is found out that either one of the wheel speed acceleration differences between front and rear wheels $\Delta A_R$ and $\Delta A_L$ is larger than the threshold value $\Delta A_{sh}$ at the step S114, i.e., when it is judged that the driving wheels are slipping, the routine returns to the step S111. At the step S111 the number of calculation N is reset to 0, and at the following steps the calculation of the relative wheel speed variations D is performed at least no times before the variations D is averaged at the step S118. When both of $\Delta A_R$ and $\Delta A_L$ are lower than the threshold value $\Delta A_{sh}$, the average variation $D_{AV}$ is calculated at the following steps and fed to the main routine in the same manner as in the sub-routine S100.

Though the relative wheel speed variation D calculated according to the formula (4) is used for judging the tire pressure in the foregoing embodiments, it may be replaced with other values such as those described in JP-A-63-305011 or JP-A-6-286430 mentioned above. Also, the acceleration difference between front and rear wheels $\Delta A_R$ ($\Delta A_L$) used for checking an imbalance of acceleration between the driven and driving wheels in the foregoing embodiments may be replaced with an acceleration ratio of the front wheel to the rear wheel.

While the present invention has been shown and described with reference to the foregoing preferred embodiments, it will be apparent to those skilled in the art that changes in form and detail may be made therein without departing from the scope of the invention as defined in the appended claims.

What is claimed is:

1. A tire pressure detecting device for use in a vehicle having driving wheels and driven wheels comprising:
   wheel speed sensors for sensing wheel speeds of respective wheels;
   first means for calculating a value representing a tire pressure condition based on the wheel speeds sensed by the wheel speed sensor;
   means for judging the tire pressure condition based on the tire condition representing value calculated by the first means;
   second means for calculating wheel speed accelerations for respective wheels based on the wheel speeds sensed by the wheel speed sensors;
   third means for calculating a value representing a comparison between driving wheel speed acceleration and driven wheel acceleration based on the wheel speed acceleration calculated by the second means; and
   means for prohibiting judgment of the tire pressure condition when the value representing a comparison between driving wheel acceleration and driven wheel acceleration exceeds a predetermined value, indicating that there exists slippage between a tire and a road surface.

2. A tire pressure detecting device according to claim 1, wherein the prohibiting means prohibits the calculation of the first means when the value representing a comparison between driving wheel acceleration and driven wheel acceleration exceeds a predetermined value, indicating that there exists slippage between a tire and a road surface.

3. A tire pressure detecting device according to claim 1, wherein the prohibiting means prohibits the first means from outputting the value representing a tire pressure condition, calculated by the first means, to the judging means, when the value representing a comparison between driving wheel acceleration and driven wheel acceleration exceeds a predetermined value, indicating that there exists slippage between a tire and a road surface.

4. A tire pressure detecting device according to claim 1, wherein the value representing a tire pressure condition is a relative wheel speed variation D.

5. A tire pressure detecting device according to claim 1, wherein the value representing a comparison between driving wheel acceleration and driven wheel acceleration is an acceleration difference $\Delta A_R$ and/or $\Delta A_L$.

* * * * *